No. 649,491. Patented May 15, 1900.
E. A. SPERRY.
ELECTRIC STORAGE BATTERY.
(Application filed Sept. 30, 1899.)
(No Model.)
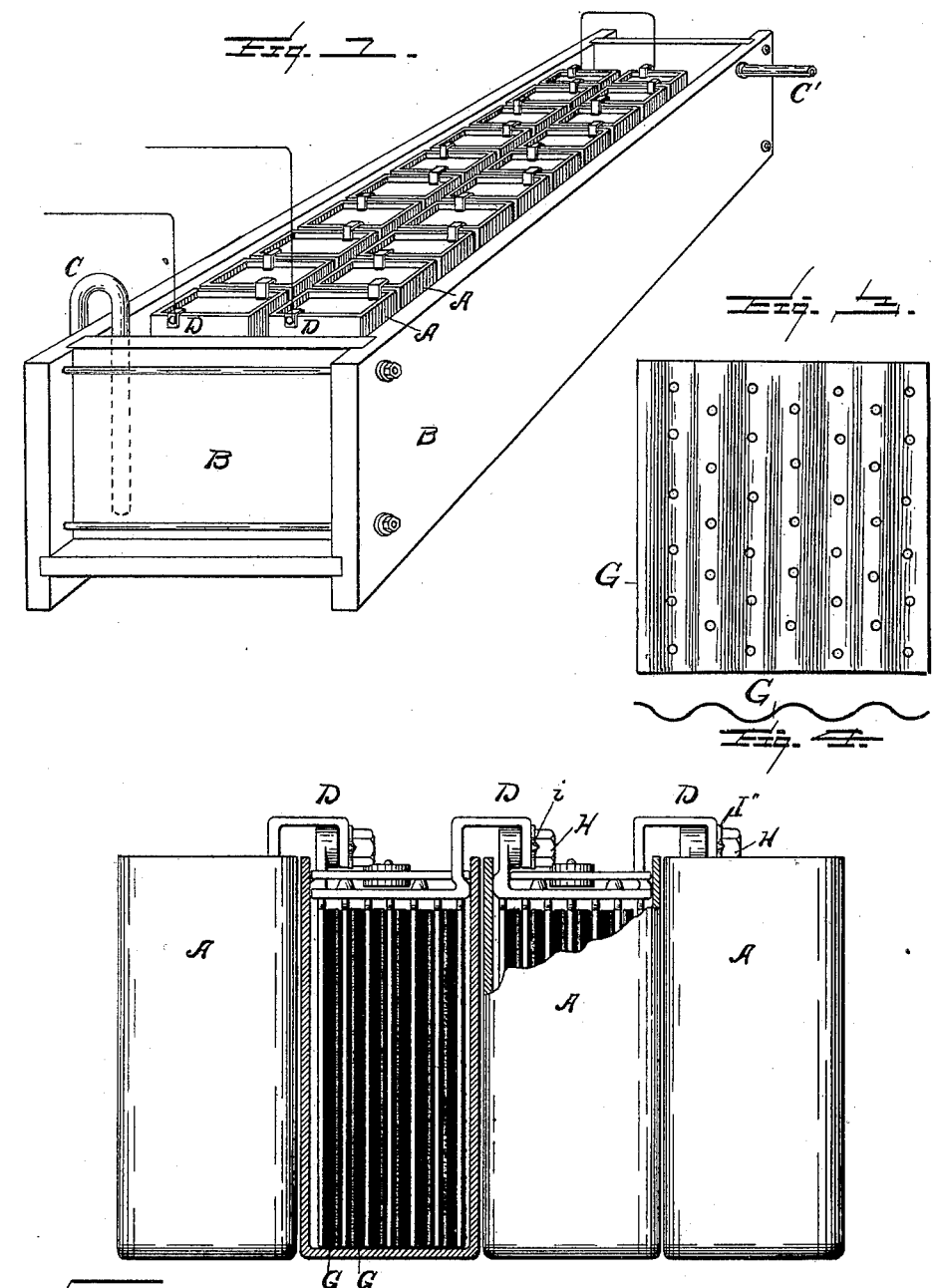

UNITED STATES PATENT OFFICE.

ELMER A. SPERRY, OF CLEVELAND, OHIO.

ELECTRIC STORAGE BATTERY.

SPECIFICATION forming part of Letters Patent No. 649,491, dated May 15, 1900.

Application filed September 30, 1899. Serial No. 732,148. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Electric Storage Batteries, of which the following is a specification.

My invention relates to a novel arrangement of the elements, receptacles, and cells of batteries, and especially storage batteries; and it consists, further, of a novel disposition of the cells within a cooling medium during at least the first part of the charge and during the filling; of new material from which the cases may be made when so grouped, and a novel arrangement of the elements within the cells with reference to their being connected to constitute a battery. These objects are attained by devices illustrated in the accompanying drawings, in which—

Figure 1 is a perspective view of a group of cells forming a battery, with the cooling arrangements, showing relation of parts. Fig. 2 is a group of cells, partially in section. Figs. 3 and 4 illustrate one form of the separators used between the plates in some forms of the battery.

Similar letters of reference indicate like parts throughout the several views.

In an electric battery where plumbic oxid forms a constituent element of the active material it is found that upon introducing the electrolyte, especially when same consists of dilute sulfuric acid and again when the oxid is employed in connection with the binding material for improving its density, and especially when such binding material consists of an alkaline material or is made from an alkaline base, a comparatively-large quantity of heat is liberated as the electrolyte gradually soaks into the active material. This heat is sufficient in some instances to wilt the receptacle or unform the corrugated separators when made of a heat-softening material, and, furthermore, it is found to unduly expand the elements themselves, causing them to crack and disintegrate. Much of the disintegration almost always present in storage batteries, especially in positive plates, has its origin in the cracking and seams opened up by the heat developed as stated.

A battery such as has been above described is illustrated in Fig. 1, consisting of the receptacles A A, &c., which are grouped in a trough or receptacle B, and may be filled with water, which rises not quite to the top of the receptacles A. The water may be changed by the intake C, and discharges at the bottom and at one end of the water-prism contained in the trough B and is discharged at the top of the other end by pipe C'. These batteries are coupled by terminals D D, &c., seen to alternate from side to side of the row of cells, as seen in Fig. 1. These terminals constitute the ends of couplers for the battery elements, which may be of any well-known type or form.

The separators G G (seen in Figs. 2, 3, and 4) may be of any well-known form, but I prefer that shown, the same being perforated and corrugated, preferably corrugated vertically. These separators are made of material impermeable to the electrolyte and preferably stiff and resilient, and they, together with the receptacles A, may be constituted from any of the well-known material, such as hard rubber, pyroxylin, or celluloid. The latter two, however, as heretofore employed, are impracticable, owing to their extreme inflammability and general combustible nature. This I have succeeded in overcoming to a degree by the addition of nitrobenzol to the pyroxylin or celluloid, by means of which it becomes less inflammable and still retains its resilient and acid-proof qualities.

It will be readily understood that while it is designed to use the above parts in the relation shown, yet some may be used without the others and the invention extends to such use. It will furthermore be readily understood that while the detailed construction has been described with more or less minuteness, yet the invention should be in no wise restricted to the exact methods and details described, but rather should be limited only in scope, as indicated in the claims.

Having thus described my invention, what I claim as new, and desire to secure by Letters Patent, is—

1. An electric battery, constituted of a group of cells containing material to become active, receptacles for the cells, a trough or vessel for holding the cells and water within the trough at a level below the top of the receptacles.

2. An electric battery, constituted of a group of cells containing material to become active, separators between the plates, consisting of heat-softening material, receptacles for the cells, a trough or vessel for holding the cells and water within the trough at a level below the top of the receptacles.

3. An electric battery, constituted of a group of cells containing material to become active, separators between the plates, consisting of corrugated celluloid, a trough or vessel for holding the cells and water in the trough, below the tops of the cells.

4. In an electric battery, elements containing material to become active, receptacles for the individual cells, consisting of a heat-softening material, a trough or vessel for holding the cell or cells and water in the trough below the top of the receptacles.

5. In an electric battery, elements containing material to become active, receptacles for the individual cells, consisting of celluloid, a trough or vessel for holding the cell or cells and water in the trough below the top of the receptacles.

6. In an electric battery, consisting of a group of cells, containing active material distributed upon a plurality of plates, separators between the plates, consisting of corrugated, heat-softening material, receptacles for the cells, a trough or vessel for holding the cells and water within the trough at a level below the top of the receptacle.

7. An electric battery, constituted of a group of cells containing material to become active, receptacles for the cells, a trough or vessel for holding the cells, water within the trough at a level below the top of the receptacles, an acid electrolyte within the receptacles, and induction and eduction ports for the water at different levels.

8. An electric battery, constituted of a group of cells containing material to become active, receptacles for the cells, a trough or vessel for holding the cells, water within the trough at a level below the top of the receptacles, an acid electrolyte within the receptacles, and induction and eduction ports for the water, the eduction low and the induction high in the water-prism.

9. An electric battery, constituted of a group of cells containing material to become active, receptacles for the cells, an elongated trough or vessel for holding the cells, water within the trough at a level below the top of the receptacles, an acid electrolyte within the receptacles, and induction and eduction ports for the water at the ends of the prism.

10. A battery of separate cells and a plurality of positive and negative elements in each, each denomination grouped in multiple by couplers, each successive cell having the terminals at opposite ends of the couplers, a trough or vessel for holding the cells and water in the trough below the tops of the cells.

ELMER A. SPERRY.

Witnesses:
W. S. ROGERS,
H. A. DORNER.